United States Patent
Kettunen et al.

(10) Patent No.: US 6,789,589 B2
(45) Date of Patent: Sep. 14, 2004

(54) BULK HANDLING DEVICE OPERATING COUPLING

(75) Inventors: Veikko Kettunen, Outakumpu (FI); Kari Kinnunen, Joensuu (FI); Jussi Makkonen, Joensuu (FI)

(73) Assignee: Outokummun Metalli Oy, Outokumpu (FI)

( * ) Notice: Subject to any disclaimer, the term of this patent is extended or adjusted under 35 U.S.C. 154(b) by 166 days.

(21) Appl. No.: 10/066,761

(22) Filed: Feb. 6, 2002

(65) Prior Publication Data

US 2003/0145903 A1 Aug. 7, 2003

(51) Int. Cl.$^7$ ............................................. A01G 23/08
(52) U.S. Cl. ..................... 144/357; 144/4.1; 144/382; 144/335; 144/24.13; 91/450
(58) Field of Search ................. 144/4.1, 34.1, 144/34.5, 335, 336, 356, 382, 402, 404, 357; 83/928; 414/694; 91/446, 450, 459, 468, 517; 60/413, 414

(56) References Cited

U.S. PATENT DOCUMENTS

| | | | |
|---|---|---|---|
| 3,731,719 A | | 5/1973 | Pierrot, III et al. |
| 3,911,981 A | * | 10/1975 | Tucek ........................ 144/34.5 |
| 3,938,566 A | | 2/1976 | Penfold et al. |
| 3,994,325 A | * | 11/1976 | Cryder et al. ............... 144/34.5 |
| 4,039,009 A | * | 8/1977 | Lindblom .................... 144/4.1 |
| 4,175,598 A | | 11/1979 | Stoychoff |
| 4,243,258 A | * | 1/1981 | Dauwalder ................. 144/34.5 |
| 4,244,405 A | * | 1/1981 | Zirker et al. ................. 144/4.1 |
| 4,632,158 A | * | 12/1986 | Haeder et al. ............ 91/450 X |
| 4,898,218 A | * | 2/1990 | Linderholm ............ 144/357 X |
| 5,129,438 A | | 7/1992 | Hamilton |
| 5,293,914 A | | 3/1994 | Hudson |
| 5,954,105 A | * | 9/1999 | Smith et al. ............ 414/694 X |
| 5,975,168 A | * | 11/1999 | Ericksson ................ 144/24.13 |

FOREIGN PATENT DOCUMENTS

SE 366900 5/1974

\* cited by examiner

Primary Examiner—W. Donald Bray
(74) Attorney, Agent, or Firm—Pillsbury Winthrop LLP

(57) ABSTRACT

A controller for controlling the operation of gripping devices of a loader harvester bulk handling device. In the controller, the coupling of a valve with the operating device of the loader harvester's cross-cutting device, and with a tilting mechanism of a tilting frame, is arranged to operate in conjunction with the cutting device and felling so that the gripping devices are normally in the closed position. The gripping devices are arranged, at least in the felling position, to always open when the guide bar or equivalent cutting device is operating or when the harvester head turns to the delimbing position, and to close immediately after the operation in question.

10 Claims, 2 Drawing Sheets

BULK HANDLING DEVICE OPERATING COUPLING

BACKGROUND OF THE INVENTION

1. Field of the Invention

The present invention relates to a controller for controlling the operation of gripping devices of a grapple harvester bulk handling device.

2. Description of Related Art

The bulk handling device makes possible the processing of several tree trunks simultaneously. Bulk handling can improve the efficiency of harvesting thinning trees and thereby getting better thinning trees to the factory. At the same time the remaining trees make better progress in attaining lumber dimensions.

The harvester control equipment is very complicated and the operator has to make many decisions in a short time period. The more simply a function occurs the more operator time is saved for the important decision of selecting and removing the tree.

SUMMARY OF THE INVENTION

One aspect of the present invention is to introduce a controller for the bulk handling device where the commands controlling the functions of the device are arranged to take place automatically without specific actions by the operator.

In an embodiment of the controller according to the present invention, the valve controlling an operating device is connected to the operating device of a loader harvester's cross-cutting device, and to a tilting mechanism of a tilting frame, and is arranged to operate in conjunction with the cutting device and felling so that the gripping devices are normally in the closed position. The gripping devices are arranged, at least in the felling position, to always open when the harvester head turns to the delimbing position, and to close immediately after the operation in question. In the controller for this type of bulk handling device, the cutting and felling operations directly and automatically control the opening and closing of the gripping devices without any special action by the operator.

In an arrangement according to the present invention, the controller may include a switch connected to the gripping devices with which the gripping devices can be mechanically moved into the open position. Where necessary, it is possible to intervene in their operation by opening the gripping devices by a manual operation. It is also possible to completely switch off the opening of the gripping devices when, for example, on a final felling site bulk handling is not utilized at all.

Additionally, the controller may include a warning light in the control cabin, or an equivalent signal on the display, which indicates when the bulk handling device is switched on. In this way the operator is always aware of the operational status of the bulk handling device.

In this manner, the operator may be freed to carry out the actual thinning and threshing work. Automated operation does not consume working time since it is carried out simultaneously alongside other necessary operations. In addition, erroneous operations are avoided, i.e., it protects the guide bar (the tree does not slip onto it) and the tree does not fall prematurely.

BRIEF DESCRIPTION OF THE DRAWINGS

The present invention is explained in more detail with reference to the following figures, in which.

DETAILED DESCRIPTION OF A PREFERRED EMBODIMENT OF THE INVENTION

Figure 1:
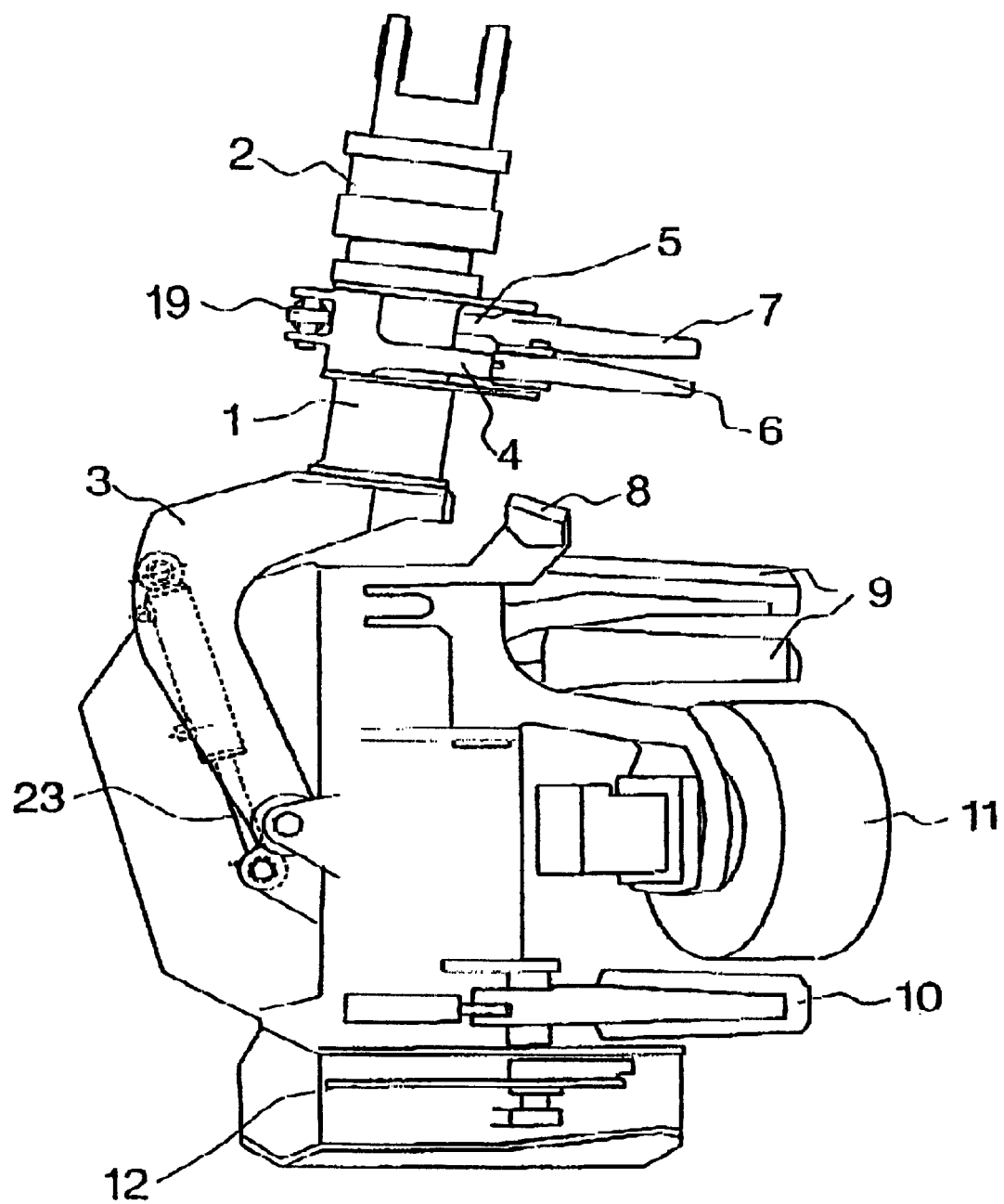
FIG. 1 shows a side view of a harvester in accordance with the principles of the present invention.

FIG. 1 shows a harvester with a bulk handling device 1 attached to it. In the figure are also numbered the essential parts in the control and operation of the bulk handling device, such as a rotator 2 and tilting arm 3, between which the bulk handling device in this arrangement is attached. Also shown are cutting device 12, delimbing devices 8, 9, and 10, feeder 11 and the cylinder 23. The bulk handling device 1 is underneath the rotator 2 on top of the tilting arm 3. The bulk handling device includes gripping devices 4 and 5, which are equipped with points 6 and 7, which are bent towards the center. The points are constructed so that they pass from under a new tree trunk to on top of the trunk, then grip the trunk so that it holds in place. It should be noted that the gripping devices are shown in FIGS. 1 and 2 in the open position for clarity, although they are normally in their closed position.

Figure 2:
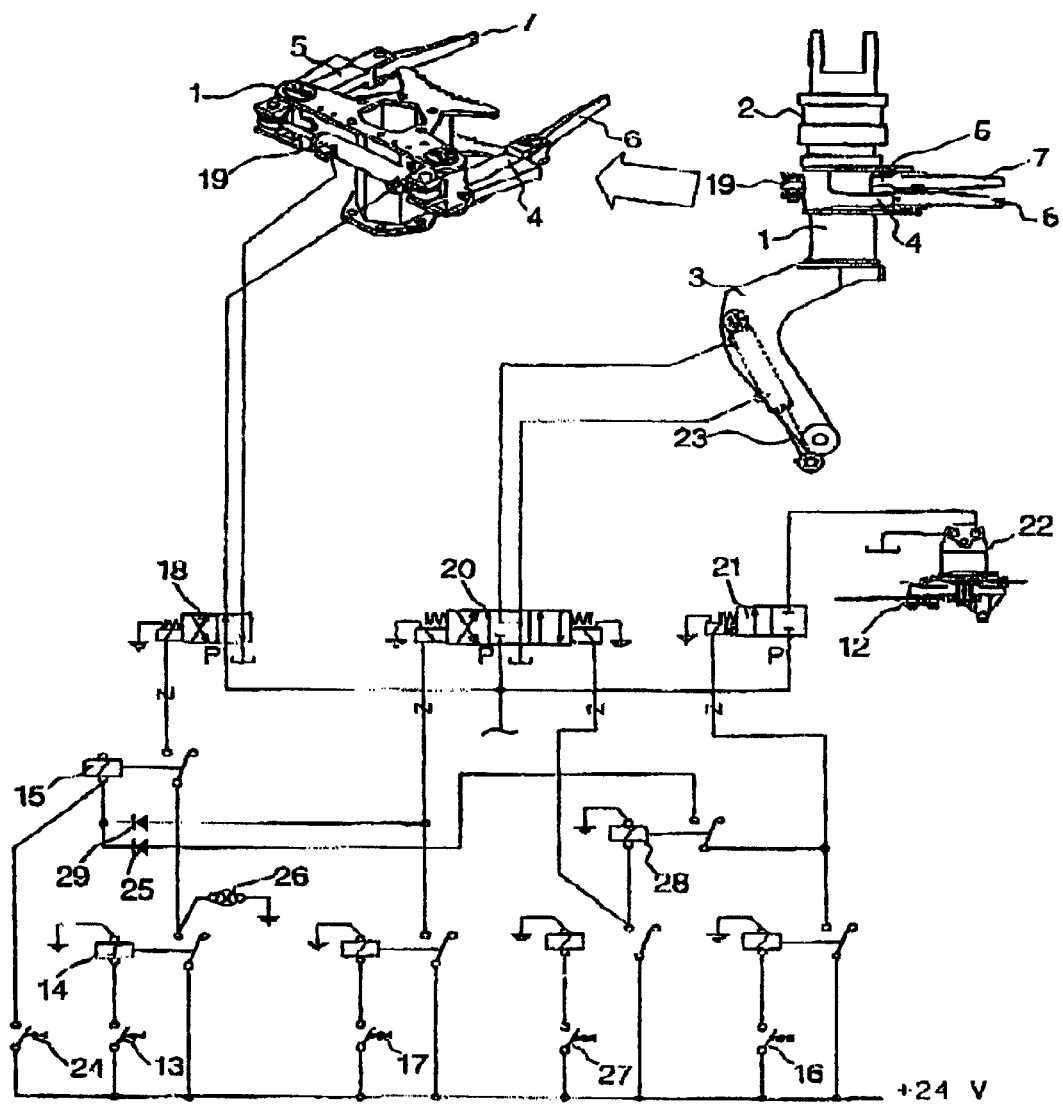
FIG. 2 shows diagrammatically an electro-hydraulic controller for a bulk handling device in accordance with the principles of the present invention.

FIG. 2 shows only the essential part of an electro-hydraulic control diagram with respect to the controller. The figure shows the principle interdependence of the bulk handling device 1, the tilting arm 3 and the cutter 12.

In the starting position, the gripping devices 4 and 5 are closed. When bulk handling is selected with the switch 13, an impulse relay 14 connects the current to alternating point relay 15. The relay is controlled directly by the control commands which, strengthened by the relay, come from a cutter switch 16 and a tilting frame felling switch 17. When the impulse relay 14 is drawing energy, a lamp 26 lights up. When the cutting switch 16 is pressed, the valve 21 is connected and a cutter motor 22 stars to rotate. If the tilting frame is in the felling position, the relay 28 is drawing energy and the control information passes through a diode 25 to the relay 15. When the tilting frame cylinder 23 is released with the felling button 17, the control information passes through both the felling valve 20 and the diode 29 to the control of the bulk handling device. The switch 24 can also be used if necessary, for example, in the event of a disorder, to mechanically open the gripping devices 4 and 5.

When the harvester is in the position shown in FIG. 1 (and the relay 28 is drawing energy), the operator guides the grab next to the selected tree. The device then grips the tree with the grabbers feeder 11 and delimbing devices 9 and 10. To cut the tree the operator presses the cutting button 16 and the relay 15 connects the current to the hydraulic valve 18 which makes the hydraulic cylinder 19 move inwards so that the gripping devices 4 and 5 open. They close again immediately once the sawing has finished. The points 6 and 7 of the gripping devices have then risen from under the selected tree to on top of it. The operator can now transfer the grab directly to the next tree to be taken. The grab is still in the vertical position. The next tree is handled in the same manner as the previous one. When the operator has gathered, in this way, a suitable number of trees in the grab, he releases the grab into the threshing position by pressing the felling button 17, at which point the gripping devices 4 and 5 open momentarily and simultaneously with the release of the tilting trunk. In this way the tree bundle is turned into the processing position.

The aforementioned embodiment presents only one of the embodiments of the present invention. Electronics and various programmed logics offer numerous possible arrangements for the controller. The invention is not therefore limited to the attached simplified operating manner. Rather many variations are possible within the framework of the invention concept formed by the claims.

What is claimed is:

1. A controller for controlling the operation of a bulk handling device, said controller comprising:

a first valve configured to be coupled to an operating device of a gripping device of said bulk handling device; and a second valve configured to be coupled to a tilting mechanism of a tilting frame of said bulk handling device;

wherein said first valve is configured to operate in conjunction with a cutting device and said second valve is configured to maintain said gripping device in a normally closed position; and wherein said controller is configured to control said gripping device to open when said cutting device is operating and said gripping device is in at least one of a felling position and a delimbing position, and to close immediately afterwards.

2. The controller as claimed in claim 1, further comprising a switch configured to be coupled to said gripping device and configured to be capable of moving said gripping device into the open position.

3. The controller as claimed in claim 1, further comprising a warning lamp or a signal on a display, said warning lamp of signal being configured to indicate an operating status of said bulk handling device.

4. The controller as claimed in claim 1, wherein said first valve and said second valve are hydraulic valves.

5. A bulk handling device comprising:

a gripping device and an operation device for operating said gripping device;

a tilting frame and a tilting mechanism for operating said tilting frame;

a cutting device; and a controller comprising:

a first valve coupled to said operating device of said gripping device; and a second valve coupled to said tilting mechanism of said tilting frame;

wherein said first valve is configured to operate in conjunction with said cutting device and said second valve is configured to maintain said gripping device in a normally closed position; and wherein said controller is configured to control said gripping device to open when said cutting device is operating and said gripping device is in at least one of a felling position and a delimbing position, and to close immediately afterwards.

6. The bulk handling device as claimed in claim 5, further comprising a switch configured to be coupled to said gripping device and configured to be capable of moving said gripping device into the open position.

7. The bulk handling device as claimed in claim 5, further comprising a warning lamp or a signal on a display, said warning lamp of signal being configured to indicate an operating status of said bulk handling device.

8. The bulk handling device as claimed in claim 5, wherein said first valve and said second valve are hydraulic valves.

9. The bulk handling device as claimed in claim 5, wherein said operating device of said gripping device is a hydraulic piston.

10. The bulk handling as claimed in claim 5, wherein said tilting mechanism of said tilting frame is a motor.

* * * * *